Figure 7:
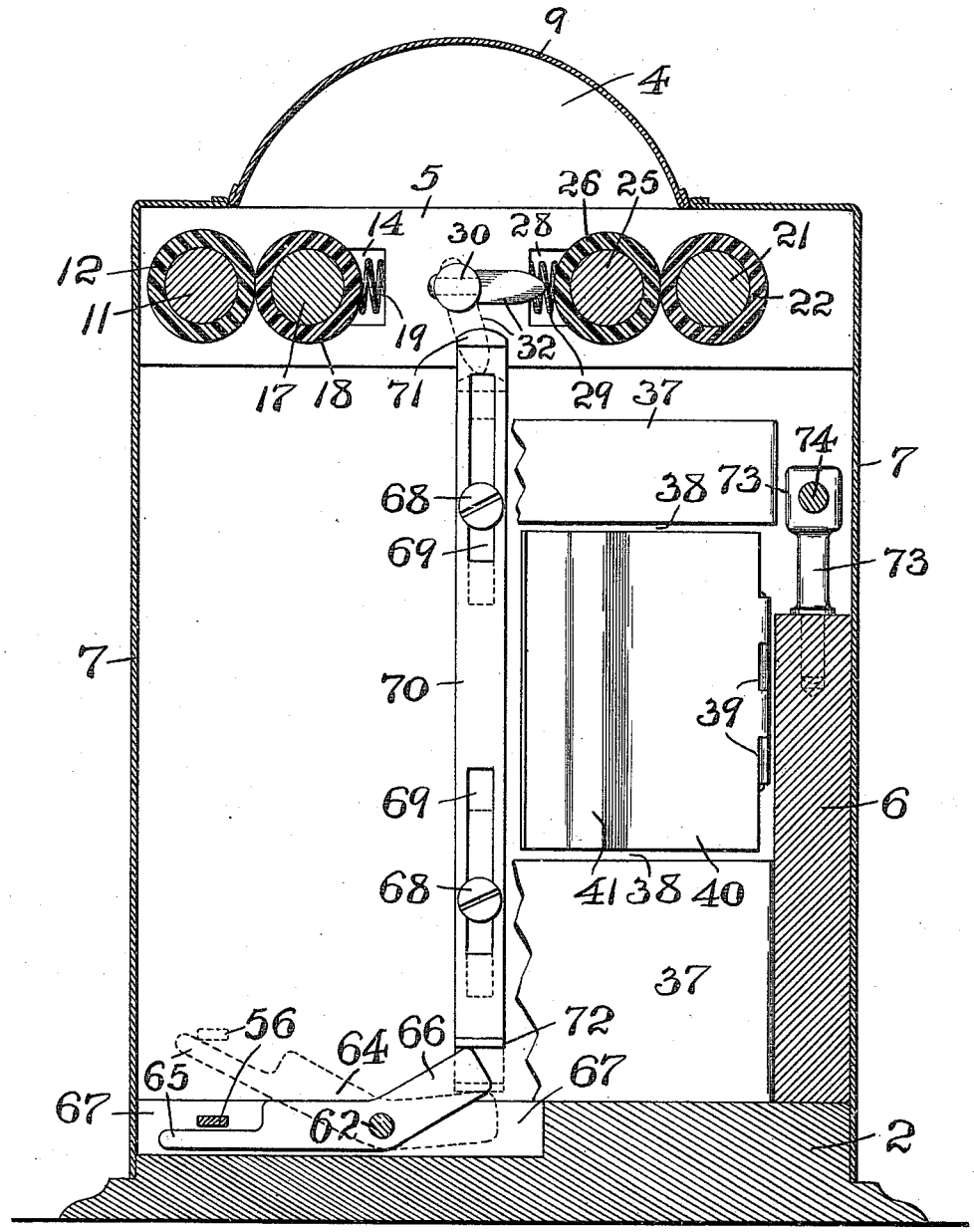

J. WEENER & S. W. GORDON.
ADVERTISING DEVICE.
APPLICATION FILED APR. 22, 1910.
985,383.
Patented Feb. 28, 1911.
6 SHEETS—SHEET 1.
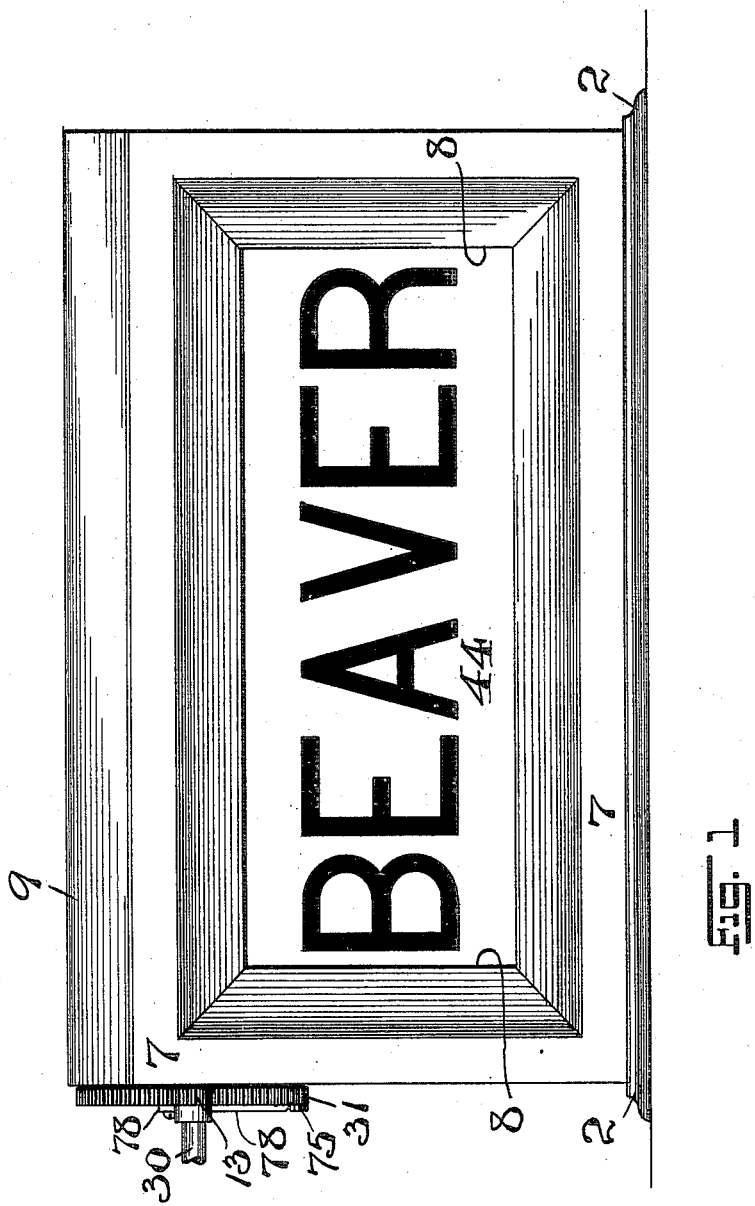
WITNESSES:
Anna H. Alter
Fredk. W. Fraentzel
INVENTORS:
Jacob Weener and
Simon W. Gordon.
BY
Fraentzel and Richards,
ATTORNEYS J. WEENER & S. W. GORDON.
ADVERTISING DEVICE.
APPLICATION FILED APR. 22, 1910.
985,383.
Patented Feb. 28, 1911.
6 SHEETS—SHEET 2.
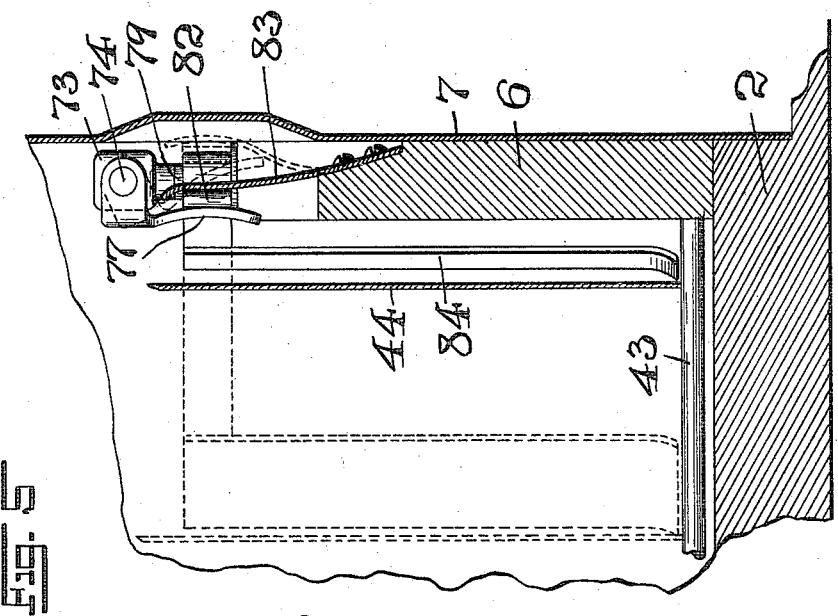
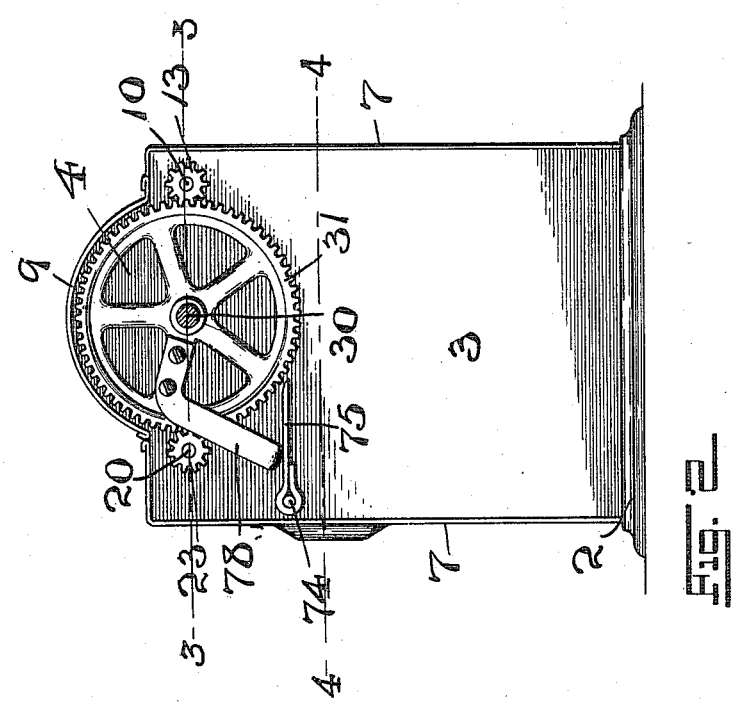
WITNESSES:
INVENTORS:
Jacob Weener and
Simon W. Gordon.
BY
Fraentzel and Richards,
ATTORNEYS

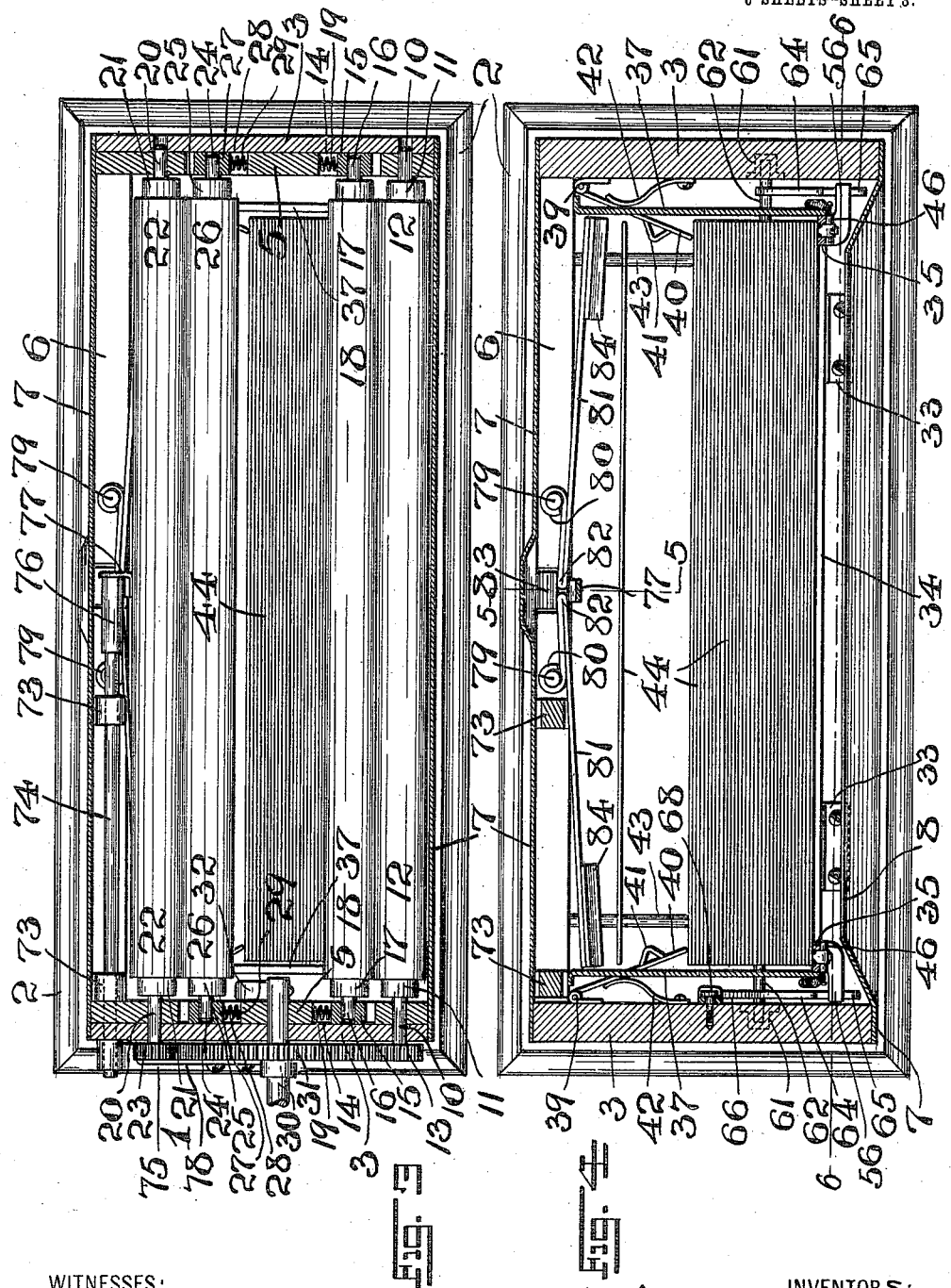

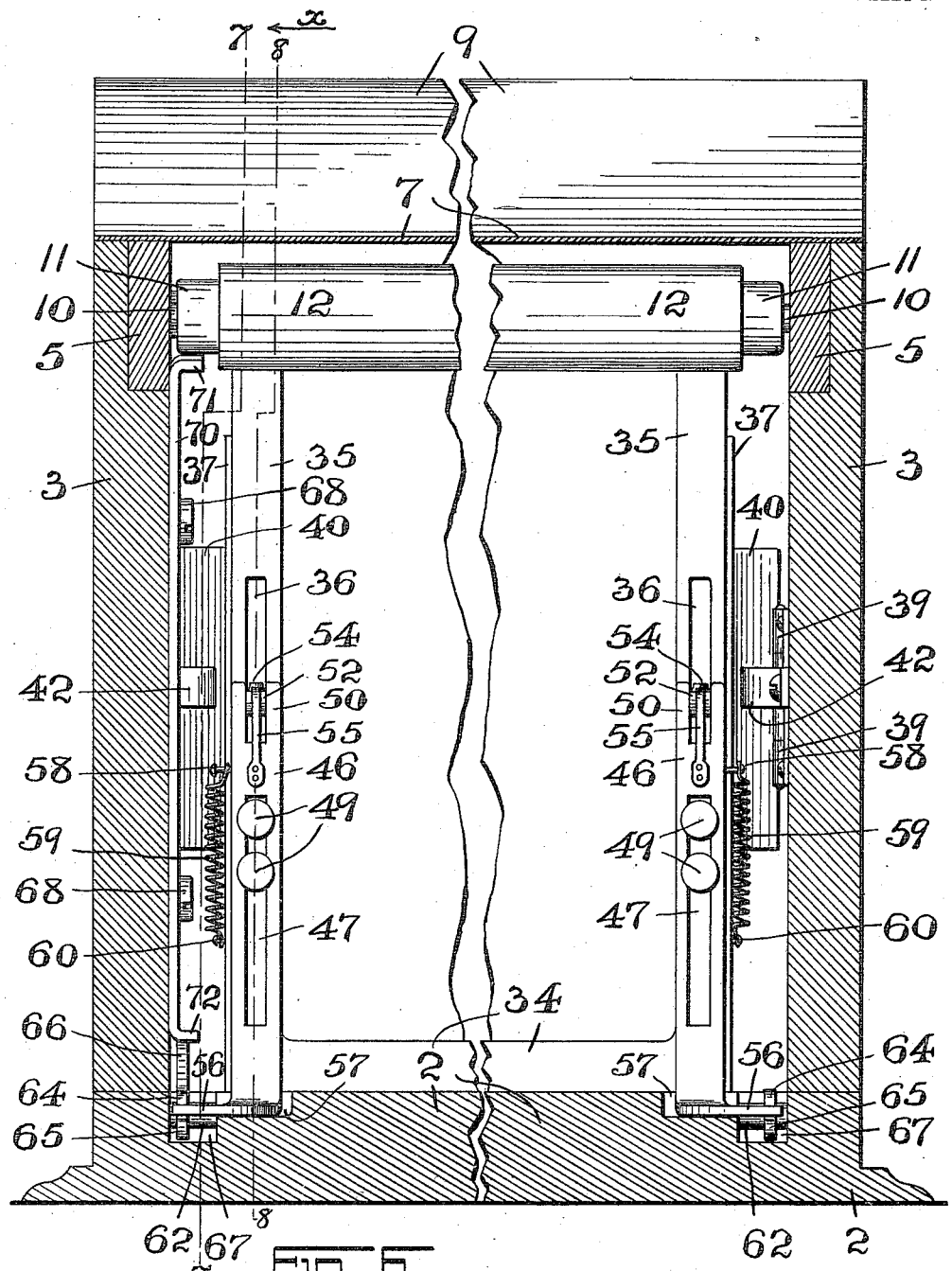

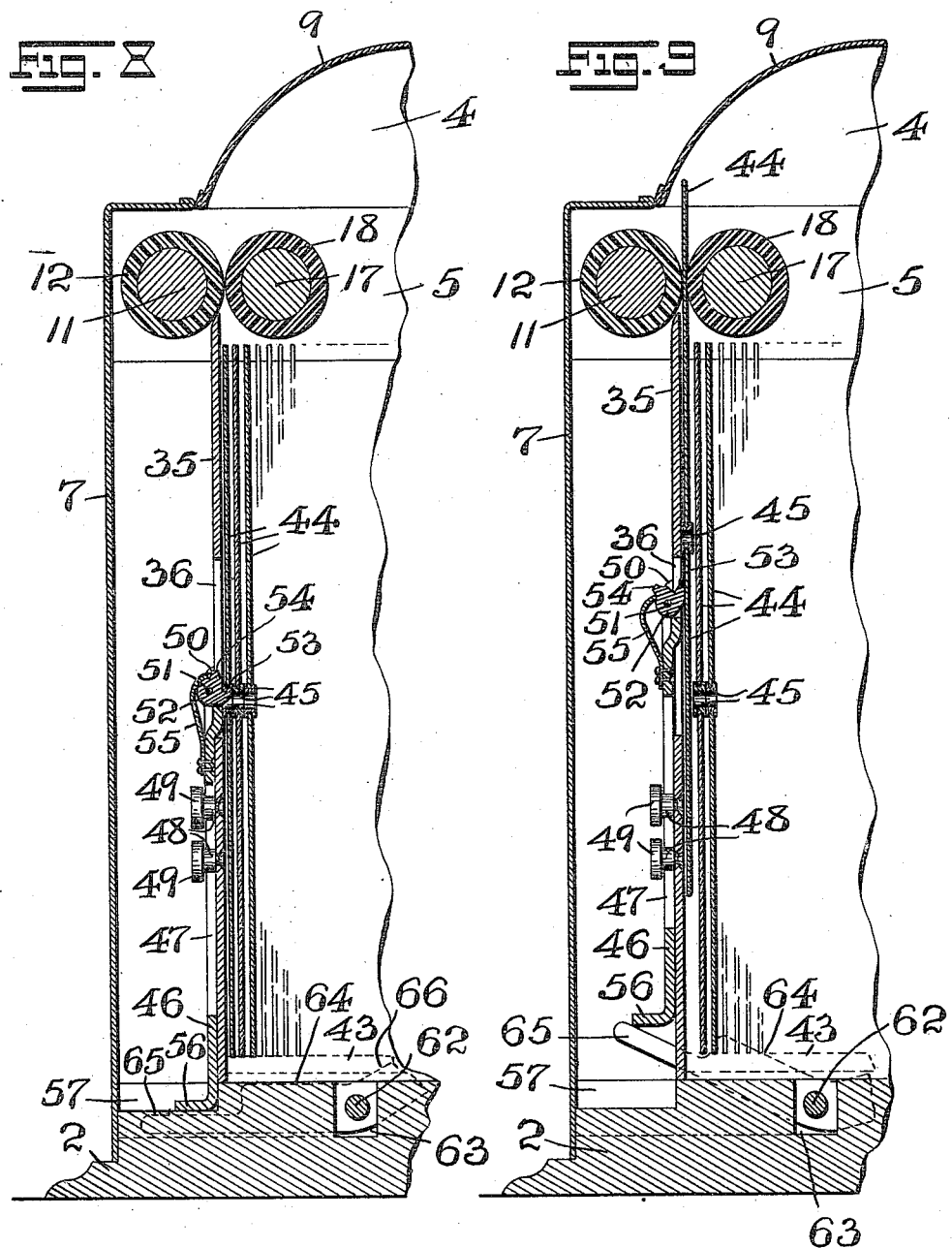

UNITED STATES PATENT OFFICE.

JACOB WEENER AND SIMON W. GORDON, OF NEWARK, NEW JERSEY, ASSIGNORS, BY DIRECT AND MESNE ASSIGNMENTS, TO THE AMERICAN ADVERTOGRAPH CO., A CORPORATION OF NEW JERSEY.

ADVERTISING DEVICE.

985,383. Specification of Letters Patent. Patented Feb. 28, 1911.

Application filed April 22, 1910. Serial No. 557,025.

*To all whom it may concern:*

Be it known that we, JACOB WEENER and SIMON W. GORDON, citizens of the United States, residing at Newark, in the county of Essex and State of New Jersey, have invented certain new and useful Improvements in Advertising Devices; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in automatic advertising devices; and, the invention has for its principal object to provide a simply constructed and readily operated mechanism for successively displaying advertising matter, the same being compact and easily adapted to be placed in stores, windows, or any other suitable places, where a continuous display of changing advertising matter is desirable and attractive.

The present invention is also easily adapted for use as a street or station indicator for railway cars of the various kinds, omnibuses, motor-buses, and the like.

A further object of the present invention is to provide a device of the character herein set forth, in which may be placed a plurality of removable or changeable advertising placards, cards or signs, the said device being equipped with a novel construction of means for quickly, easily and automatically presenting at a display opening in said device the said advertising placards successively, that is one after another at stated intervals of time.

A still further object of the present invention is to provide a mechanism for successively displaying a plurality of advertising placards, cards or signs, the operation of the mechanism being such that not only will it display said advertising placards successively, but after each placard has been displayed, will automatically turn the same over, and subsequently display its opposite side at the display opening of the novel device, in this manner rendering it possible to use all the spaces of said placards, that is both sides of the same for advertising matter, or for the purpose of indicating stations and the names of streets.

With the various objects of the present invention in view, the said invention consists, primarily, in the novel advertising device hereinafter set forth; and, furthermore, this invention consists in the several arrangements and combinations of devices and parts, as well as in the details of the construction of the same, all of which will be more fully described in the following specification and then finally embodied in the clauses of the claims, which are appended to and which form an essential part of this specification.

The invention is clearly illustrated in the accompanying drawings, in which:—

Figure 1 is a front elevation of said novel advertising device embodying the principles of the present invention. Fig. 2 is an end elevation of the same. Fig. 3 is a horizontal section, taken on lines 3—3 in said Fig. 2; Fig. 4 is a similar section, taken on line 4—4 also in said Fig. 2; and Fig. 5 is a detail vertical cross-section, taken on line 5—5 in said Fig. 4, said view being made on an enlarged scale. Fig. 6 is a longitudinal vertical section, taken on line 6—6 in said Fig. 4, this view being also made on an enlarged scale; Fig. 7 is a vertical cross-section taken on line 7—7 in said Fig. 6, looking in the direction of the arrow $x$; and Fig. 8 is a detail vertical cross-section taken on line 8—8 in said Fig. 6, and also looking in the direction of the arrow $x$. Fig. 9 is a detail vertical cross-section similar to that shown in Fig. 8 except that in this figure certain parts of the device are indicated in their operating positions.

Similar characters of reference are employed in all of the hereinabove described views, to indicate corresponding parts.

Referring now to the accompanying drawings, the said device or apparatus comprises a base-plate 2, and externding upwardly from said base-plate 2 are the side-walls 3, the upper portions of which are provided with semi-circular supporting members 4. Arranged upon the inner side of each side wall 3 is a bearing-plate 5. Suitably disposed upon said base-plate 2, so as to extend between said side-walls 3, is a back-wall 6. Connected with said base-plate 2 and the side-walls 3 are casing-portions 7, the front casing-portion 7 being provided with a suitable opening 8 through which a display of advertising matter may be exposed to view. Extending across the semi-circular supporting members 4 from side to side of said advertising device is a semi-circular top or casing-portion 9. Mounted in the said bearing-plates 5 are the journals 10 of a roller-member 11, the said roller-member 11 being provided with a resilient covering 12. One of the journals 10 projects through one of the side-walls 3 and is provided upon its free end with a pinion 13. The said bearing-plates 5 are each provided with a slotted portion 14 in each of which is arranged a slidable bearing-block 15. Mounted in said slidable bearing-blocks 15 are the journals 16 of another roller-member 17, the same being also provided with a resilient covering 18. Arranged between one end of each of said slotted portions 14, and the respective bearing-blocks 15 arranged therein, is a spring 19, which by pressing upon said bearing-blocks 15 tends to keep the said roller-member 17 impinging upon the adjacent roller-member 11. The said roller-members 11 and 17 are mounted so as to be directly beneath the front end of said semi-circular top or casing-portion 9. In like manner, there is arranged and mounted in said bearing-plates 5 another pair of similar roller-members mounted directly beneath the rear end of the said semi-circular top or casing-portion 9. These roller-members comprise the journals 20 of a roller-member 21, having a resilient covering 22, one of said journals projecting through one of said side-walls 3, and being provided upon its free end with a pinion 23, and the journals 24 of another roller-member 25, also provided with a resilient covering 26. Said journals 24 are mounted in suitable bearing-blocks 27 which are slidably arranged within a slot 28 with which each bearing-plate 5 is provided, a spring 29 being arranged between each bearing-block 27 and one end of the slot 28, to keep said roller-member 21 impinging upon said roller-member 25. Mounted in one of said bearing-plates 5 is a driving shaft 30, the same projecting through the side-wall 3, and being provided with a gear wheel 31 which meshes with the pinions 13 and 23 of the respective roller-members 11 and 21. Secured upon the inwardly projecting end of said driving shaft 30 is a cam-member 32. Supported within the said casing upon the base-plate 2, and secured by means of the bracket-pieces 33, is a frame-member 34, which is provided at each end with an upwardly extending guide-member 35 which extends up to a point beneath the roller-members 13 and 17. Each of the said guide-members 35 is provided with a slotted portion 36. Extending backwardly from each of said guide-members are partition-members 37, the same being secured at their rear edges to said back-wall 6, and the same being further provided with a cutaway portion 38. Secured to the inner side of each side-wall 3 is the hinge-portion 39 of a movable retainer-member 40, the same being provided with a cam-portion 41. Secured to the inner side of each side-wall 3 is a flat-spring 42, the free end of which engages said movable retainer-member 40 so as to maintain the same in its normal retaining position for the purposes to be herein subsequently described. Extending rearwardly from said frame-member 34, and secured thereto in a position adjacent to the said bottom-plate 2, are a pair of supporting rods 43, upon which are supported, behind the said frame-work 34 and its guide-members 35 and between said partition 37, a plurality of advertising placards, cards or signs 44, the same being provided adjacent to their vertical edges with eyelet-portions 45, which are adapted to register with the slotted portion 36 of said guide-members 35.

Slidably arranged upon each guide-member 35 is a placard or card-shifter 46, the same being provided with a slotted portion 47, and suitably secured to said guide-members 35 are retaining shanks 48 which extend through the slotted portion 47 of the placard-shifter 46, said retaining shanks 48 being provided with heads 49 for securing said placard or card-shifter in operative sliding engagement with said guide-member. The said placard or card-shifter 46 is provided at its upper end with a forked portion 50, between the members of which is pivotally mounted upon a pintle 51, a lifter-cam 52 which is provided with a nosing 53 and which extends through the slotted portion 36 of said guide-members 35 in position to engage the eyelets or perforated portions 45 of the advertising placard or card 44 next adjacent to said frame-member 34 and its guide-members 35. The said lifter-cam 52 is further provided with a lug 54, which is adapted to be engaged by the free end of a flat spring 55 secured to said placard or card-shifter 46 for the purpose of normally retaining said lifter-cam 52 and its nosing 53 in its operative engagement with said eyelets or perforated portions 45 of the said advertising placards 44. The lower end of said placard-shifter 46 is provided with a right-angled and outwardly extending lug 56 and the said base-plate 2 is provided with a cut-out portion 57 adapted to receive the same. Secured to a pin or lug 58, arranged upon said partition-members 37, is a coiled spring 59, the opposite end of which is secured to a pin or lug 60 arranged upon said placard-shifter 46, the function of said spring 59 being to maintain and return said placard-shifter to its normal initial position after the same has been operated to shift or lift an advertising placard, card or sign 44. Mounted in socket-bearings 61, arranged in the side-walls 3, is a rock-shaft 62, the same extending through a groove or channel 63 in said base-plate 2, and secured upon said rock-shaft 62 are forwardly extending lifting levers 64 which are provided with suitable fingers or similar portions, as 65, adapted to be brought in lifting engagement with the lug 56 of said placard-shifter 46. One of said lifting levers 64 is provided with an upwardly and backwardly extending arm 66, and the said base-plate 2 is provided with suitable cutout portions 67 adapted to receive said lifting levers 64. Secured to the inner side of one of said side-walls 3 are a pair of studs 68, and slidably arranged upon said studs 68, by means of its slotted portions 69, is a push-bar 70. The said push-bar 70 is provided at its upper end with a contact-piece 71 adapted to be operatively engaged by said cam-member 32 which is connected with said driving shaft 30. The lower end of said push-bar 70 is provided with a similar contact-piece 72 adapted to operatively engage the free end of said upwardly and backwardly extending arm 66 of one of said lifting levers 64. Secured upon the upper portion of said back-wall 6 are a pair of bearing-members 73, and mounted in said bearing members 73 is a rock-shaft 74, one end of which projects through one of the side-walls 3, and has secured upon its outer end a lever-arm 75. Secured upon the inner end of said rock-shaft 74 is a sleeve 76 with which is connected a downwardly extending lever-portion 77. Suitably secured upon the said gearwheel 31 is a contact-arm 78, which is adapted to revolve with said gear-wheel, and with every revolution of the wheel 31 is brought in operative engagement with said lever-arm 75. Secured in suitable locations upon said back-wall 6 are a pair of studs 79 upon which are pivotally mounted suitable bearing-portions 80 of oppositely extending swinging lever-arms 81, a portion of said swinging lever-arms 81 being doubled upon themselves to form contact-members 82, the free ends of which are adapted to be engaged by said lever-portion 77. Secured to said back-wall 6 is a flat spring 83, the free end of which is adapted to operatively engage the back of the end-portions of said contact-members 82, for the purpose of maintaining and returning said swinging lever-arms to their normal initial positions. Secured upon the free ends of said oppositely extending swinging lever-arms are push-plates 84.

Having thus described the general construction of my novel advertising device and specified in detail the parts making up the same, it remains to describe, in general, how the said parts coöperate with each other in carrying out the functions of the said novel advertising device. The said advertising device is operated by means of said driving shaft 30, and can be arranged so as to be driven by power or hand, to suit the conditions under which the same is to be used. As the said driving shaft 30 revolves, the gear-wheel 31 also revolves, and transmits its revolutions to the respective pinions 13 and 23, by means of which the said two sets of roller-members are revolved in proper directions. The said driving shaft carries around, during its revolution, the said cam-member 32, which at a proper time in its revolution engages the contact-piece 71 of said push-bar 70, whereby the latter is forced downwardly, so that its lower contact-piece 72 is brought in engagement with the upwardly and backwardly extending arm 66, whereby the rock-shaft 62 is oscillated so as to carry upward the said lever-arms 64. The fingers or portions 65 of said lever-arms 64 are thus brought respectively in lifting engagement with the lugs 56 of said placard-shifters 46. The said placard or card-shifters 46 are thus caused to move upwardly and the nosing 53 of the lifter-cams 52 are brought in operative contact with the eyelets or perforated portions 45 of an advertising placard, card or sign 44, whereby the same is carried upward between the roller-members 11 and 17. By the time the said advertising placard 44 has been properly engaged by said roller-members 11 and 17, the cam-member 32 has passed away from its contact with said push-bar 70, and the spring 59 returns the said placard or card-shifter 46, and its operating parts, to their normal initial positions, the nosing 53 of said lifter-cam 52 being swung outwardly and away from contact with the eyelets or perforated portions 45 of said placards 44, by the downward movement of said placard shifter 46. In the meantime, the revolving roller-members 11 and 17 carry said advertising placard, card or sign 44, upwardly between the same, and force it against the inner side of the semi-circular top or casing 9 which guides the placard, card, or sign around until it is forced between the roller-members 21 and 25, which revolving in a direction opposite to the said roller-members 11 and 17, force said placard, card or sign 44 downwardly in front of the swinging lever-arms 81 and their push-plates 84, and thereby presents the opposite or reverse side of said placard or card 44 toward the front of the advertising device. By the time the said placard, card or sign has thus been arranged, the contact-arm 78 is carried around by the gear-wheel 31 and is brought in contact with the lever-arm 75, which being pushed downwardly, operates the rock-shaft 74 and its lever-portion 77. The latter is thereby forced against the con- tact-members 82 of the swinging lever-arms 81, whereby the latter are caused to swing inwardly and carry the push-plates 84 against said placard, card or sign 44, forcing the same against the cam-portions 41 of said retainer-members 40 which yield to its passage by swinging outwardly, thus allowing said placard, card or sign to be deposited at the back or rear of the pile or plurality of advertising placards 44. Under the action of the spring 83, the said swinging lever-arms are returned to their normal initial positions, and the springs 42 acting upon said retainer-members 40 swing the same back to their normal retaining positions with their free vertical edges engaging the back of said pile or plurality of advertising placards or cards 44, to retain the same in a proper position against the frame-member 34 and its guide-portions 35. The above described operations are made with each revolution of said gear-wheel 31, so that the advertising placards, cards or signs 44 are shown at the display opening, successively, and then reversed so that the opposite sides thereof are successively displayed.

I am aware that changes may be made in the several arrangements and combinations of the various devices and parts, as well as in the details of the construction thereof, without departing from the scope of my present invention, as described in the foregoing specification; and as defined in the claims appended thereto. Hence I do not limit my invention to the exact arrangements and combinations of the devices and parts as described in the said specification, nor do I confine myself to the exact details of the construction of the said parts as illustrated in the accompanying drawings.

I claim:—

1. In an advertising device, the combination with a casing provided with a display-opening, and a semi-circular top-casing, of a pair of roller-members arranged beneath the front end of said semi-circular top-casing, a pair of oppositely moving roller-members arranged beneath the back end of said semi-circular top-casing, a plurality of advertising placards arranged within said casing adjacent to said display opening, and means for successively removing said placards from said display-opening and feeding the same to said roller members whereby they are reversed and returned within said casing to successively display the reverse sides thereof at said display opening.

2. In an advertising device, the combination with a casing provided with a display-opening and a semi-circular top-casing, of a pair of roller members arranged beneath the front end of said semi-circular top-casing, a pair of oppositely moving roller-members arranged beneath the back end of said semi-circular top-casing, means for operating each pair of roller-members, a frame-work provided with guide-members arranged within said casing adjacent to said display-opening, a plurality of advertising placards arranged back of said frame-work and its guide-members, placard-shifters connected with each of said guide-members, means for operating said placard-shifters to remove said placards successively from said display-opening and to feed the same to said pairs of roller-members whereby said placards are reversed and returned within said casing to successively display the reverse sides thereof at said display-opening.

3. In an advertising device, the combination, with a casing provided with a display opening and a semi-circular top-casing, of a pair of roller-members arranged beneath the front end of said semi-circular top-casing, a pinion connected with one of the journals of one of said roller-members, a pair of oppositely moving roller-members arranged beneath the back end of said semi-circular top-casing, a pinion connected with one of the journals of one of said oppositely moving roller-members, a driving-shaft, a gear-wheel secured upon said driving shaft and in mesh with the respective pinions of said two pairs of roller-members, a cam-member upon said driving shaft, a framework provided with guide-members arranged within said casing adjacent to said display-opening, a plurality of advertising placards arranged back of said frame-work and its guide-members, placard-shifters connected with each of said guide-members, means adapted to be operated by said cam-member of said driving shaft for operating said placard-shifters to remove said placards successively from said display opening and to feed the same to said pairs of roller-members whereby said placards are reversed and returned within said casing to successively display the reverse sides thereof at said display opening, substantially as and for the purposes set forth.

4. The combination in an advertising device of the character described, of a plurality of advertising placards movably disposed within said device, said advertising placards being each provided with suitably disposed eyelet-portions, a frame-work provided with slotted guide-members, carrying and reversing roller-members arranged within said advertising device, means for shifting the front or display placard to said carrying and reversing roller-members, said means being arranged upon said slotted guide-members and comprising, placard-shifters slidably arranged upon said slotted guide-members, a lifter-cam pivotally connected with the upper end of each placard-shifter, a nosing connected with each lifter-cam and adapted to engage the eyelet-portions of said front or displayed placard, springs for maintaining said lifter-cams in their operative positions, an outwardly extending lug connected with the lower portion of each placard-shifter, and means for operatively engaging said lugs to raise said placard-shifters and to carry upwardly to said roller-members the front or displayed advertising-placard, substantially as and for the purposes set forth.

5. The combination in an advertising device of the character described, of a plurality of advertising placards movably disposed within said device, said advertising placards being each provided with suitably disposed eyelet-portions, a frame-work provided with slotted guide-members, carrying and reversing roller-members arranged within said advertising device, means for shifting the front or display placard to said carrying and reversing roller-members, said means being arranged upon said slotted guide-members and comprising, placard-shifters slidably arranged upon said slotted guide-members, a lifter-cam pivotally connected with the upper end of each placard-shifter, a nosing connected with each lifter-cam and adapted to engage the eyelet-portions of said front or displayed placard, springs for maintaining said lifter-cams in their operative positions, an outwardly extending lug connected with the lower portion of each placard-shifter, and means for operatively engaging said lugs to raise said placard-shifters and to carry upwardly to said roller-members the front or displayed advertising-placard, said means comprising a rock-shaft, lifting-levers connected with said rock-shaft adapted to engage said lugs of said placard-shifters, one of said lifting-levers being provided with a backwardly and upwardly extending arm, a push-bar slidably arranged within said advertising device adapted to engage said backwardly and upwardly extending arm, and means for operating said push-bar, substantially as and for the purposes set forth.

6. The combination in an advertising device of the character described, of a plurality of advertising placards movably disposed within said device, said advertising placards being each provided with suitably disposed eyelet-portions, a frame-work provided with slotted guide-members, carrying and reversing roller-members arranged within said advertising device, means for shifting the front or display placard to said carrying and reversing roller-members, said means being arranged upon said slotted guide-members and comprising, placard-shifters slidably arranged upon said slotted guide-members, a lifter-cam pivotally connected with the upper end of each placard-shifter, a nosing connected with each lifter-cam and adapted to engage the eyelet-portions of said front or displayed placard, springs for maintaining said lifter-cams in their operative positions, an outwardly extending lug connected with the lower portion of each placard-shifter, and means for operatively engaging said lugs to raise said placard-shifters and to carry upwardly to said roller-members the front or displayed advertising placard, said means comprising a rock-shaft, lifting levers connected with said rock-shaft adapted to engage said lugs of said placard-shifters, one of said lifting-levers being provided with a backwardly and upwardly extending arm, a push-bar slidably arranged within said advertising device adapted to engage said backwardly and upwardly extending arm, means for operating said push-bar, comprising a driving shaft, and a cam-member connected therewith, and means for returning said placard-shifters and their operating mechanism to their normal initial positions, substantially as and for the purposes set forth.

7. The combination in an advertising device, comprising a casing having a display opening, of a plurality of advertising placards, means for successively displaying said placards at the display-opening of said advertising device, a carrying and reversing mechanism, means for successively shifting and feeding said placards to said carrying and reversing mechanism, said carrying and reversing mechanism comprising a semi-circular top-casing, a pair of roller-members provided with a resilient covering mounted beneath the front end of said semi-circular top-casing, one of said roller-members being provided with a driving pinion, the other of said roller-members being mounted in spring-actuated and slidable bearing-members whereby said roller-member is caused to impinge upon the adjacent roller-member, a second pair of oppositely revolving roller-members provided with a resilient covering mounted beneath the rear end of said semi-circular top-casing, one of said second pair of roller-members being provided with a driving pinion, the other of said second pair of roller members being mounted in spring-actuated slidable bearing-members whereby said roller-member is caused to impinge upon the adjacent roller-member of said second pair of roller-members, and means for operating said roller-members, comprising a driving shaft, and a gear-wheel secured upon said driving-shaft adapted to mesh with the respective pinions of the first-mentioned pair and said second pair of roller-members, substantially as and for the purposes set forth.

8. The combination in an advertising device comprising a casing having a display opening, in which are arranged a plurality of advertising placards, of means for successively displaying said placards at the display-opening of said advertising device, a carrying and reversing mechanism, means for successively shifting and feeding said placards to said carrying and reversing mechanism whereby the said placards may be reversed so that their opposite sides may be successively displayed at the display-opening of said advertising device, means for retaining said plurality of placards in their operative position within said advertising device, said means comprising retainer-members pivotally secured to the inner side-walls of said advertising device, the free vertical edges of said retainer-members being adapted to operatively engage the rear of said plurality or pile of placards, and springs for maintaining and returning said retainer-members in their normal operative positions, substantially as and for the purposes set forth.

9. The combination in an advertising device comprising a casing having a display opening, in which are arranged a plurality of advertising placards, of means for successively displaying said placards at the display-opening of said advertising device, a carrying and reversing mechanism, means for successively shifting and feeding said placards to said carrying and reversing mechanism whereby the said placards may be reversed so that their opposite sides may be successively displayed at the display-opening of said advertising device, means for retaining said plurality of placards in their operative position within said advertising device, said means comprising retainer-members pivotally secured to the inner side-walls of said advertising device, the free vertical edges of said retainer-members being adapted to operatively engage the rear of said plurality or pile of placards, and springs for maintaining and returning said retainer-members in their normal operative positions, cam-portions upon said retainer-members adapted to be engaged so as to move the same from their operative retaining positions, and means for returning a reversed placard to said operative position of said plurality or pile of placards and in front of said retainer-members, substantially as and for the purposes set forth.

10. The combination in an advertising device comprising a casing having a display opening, in which are arranged a plurality of advertising placards, of means for successively displaying said placards at the display-opening of said advertising device, a carrying and reversing mechanism, means for successively shifting and feeding said placards to said carrying and reversing mechanism whereby the said placards may be reversed so that their opposite sides may be successively displayed at the display-opening of said advertising device, means for retaining said plurality of placards in their operative position within said advertising device, said means comprising retainer-members pivotally secured to the inner side-walls of said advertising device, the free vertical edges of said retainer-members being adapted to operatively engage the rear of said plurality or pile of placards, springs for maintaining and returning said retainer-members in their normal operative positions, cam-portions upon said retainer-members adapted to be engaged so as to move the same from their operative retaining positions, and means for returning a reversed placard to said operative position of said plurality or pile of placards and in front of said retainer-members, said means comprising a pair of oppositely extending swinging lever-arms pivotally mounted within said advertising device, push-plates connected with the outer free ends of said lever-arms adapted to engage and push forward said reversed placard, contact-members connected with said lever-arms, and means for operating said lever-arms, substantially as and for the purposes set forth.

11. The combination in an advertising device comprising a casing having a display opening, in which are arranged a plurality of advertising placards, of means for successively displaying said placards at the display-opening of said advertising device, a carrying and reversing mechanism, means for successively shifting and feeding said placards to said carrying and reversing mechanism whereby the said placards may be reversed so that their opposite sides may be successively displayed at the display-opening of said advertising device, means for retaining said plurality of placards in their operative position within said advertising device, said means comprising retainer-members pivotally secured to the inner side-walls of said advertising device, the free vertical edges of said retainer-members being adapted to operatively engage the rear of said plurality or pile of placards, and springs for maintaining and returning said retainer-members in their normal operative positions, cam-portions upon said retainer-members adapted to be engaged so as to move the same from their operative retaining positions, means for returning a reversed placard to said operative position of said plurality or pile of placards and in front of said retainer-members, said means comprising a pair of oppositely extending swinging lever-arms pivotally mounted within said advertising device, push-plates connected with the outer free ends of said lever-arms adapted to engage and push forward said reversed placard, contact-members connected with said lever-arms, means for operating said lever-arms, comprising a rock-shaft mounted within said advertising device, a lever-portion connected with said rock-shaft and adapted to operatively engage said contact-members of said lever-arms, and means for oscillating said rock-shaft, substantially as and for the purposes set forth.

12. The combination in an advertising device comprising a casing having a display opening, in which are arranged a plurality of advertising placards, of means for successively displaying said placards at the display-opening of said advertising device, a carrying and reversing mechanism, means for successively shifting and feeding said placards to said carrying and reversing mechanism whereby the said placards may be reversed so that their opposite sides may be successively displayed at the display-opening of said advertising device, means for retaining said plurality of placards in their operative position within said advertising device, said means comprising retainer-members pivotally secured to the inner side-walls of said advertising device, the free vertical edges of said retainer-members being adapted to operatively engage the rear of said plurality or pile of placards, and springs for maintaining and returning said retainer-members in their normal operative positions, cam-portions upon said retainer-members adapted to be engaged so as to move the same from their operative retaining positions, means for returning a reversed placard to said operative position of said plurality or pile of placards and in front of said retainer-members, said means comprising a pair of oppositely extending swinging lever-arms pivotally mounted within said advertising device, push-plates connected with the outer free ends of said lever-arms adapted to engage and push forward said reversed placard, contact-members connected with said lever-arms, means for operating said lever-arms, comprising a rock-shaft mounted within said advertising device, a lever-portion connected with said rock-shaft and adapted to operatively engage said contact-members of said lever-arms, means for oscillating said rock-shaft, comprising a driving shaft connected with said advertising device, a gear-wheel secured to said driving-shaft, a contact-arm secured to said gear-wheel and adapted to revolve therewith, and a lever-arm secured to the outer end of said rock-shaft and adapted to be operatively engaged by said revolving contact-arm, substantially as and for the purposes set forth.

In testimony, that we claim the invention set forth above we have hereunto set our hands this ninth day of April, 1910.

JACOB WEENER.
SIMON W. GORDON.

Witnesses:
FREDK. C. FRAENTZEL,
FRED'K H. W. FRAENTZEL.

Copies of this patent may be obtained for five cents each, by addressing the "Commissioner of Patents, Washington, D. C."